May 7, 1946. J. E. GLOVER, JR 2,399,732
AIRCRAFT STRUCTURE
Filed July 24, 1943
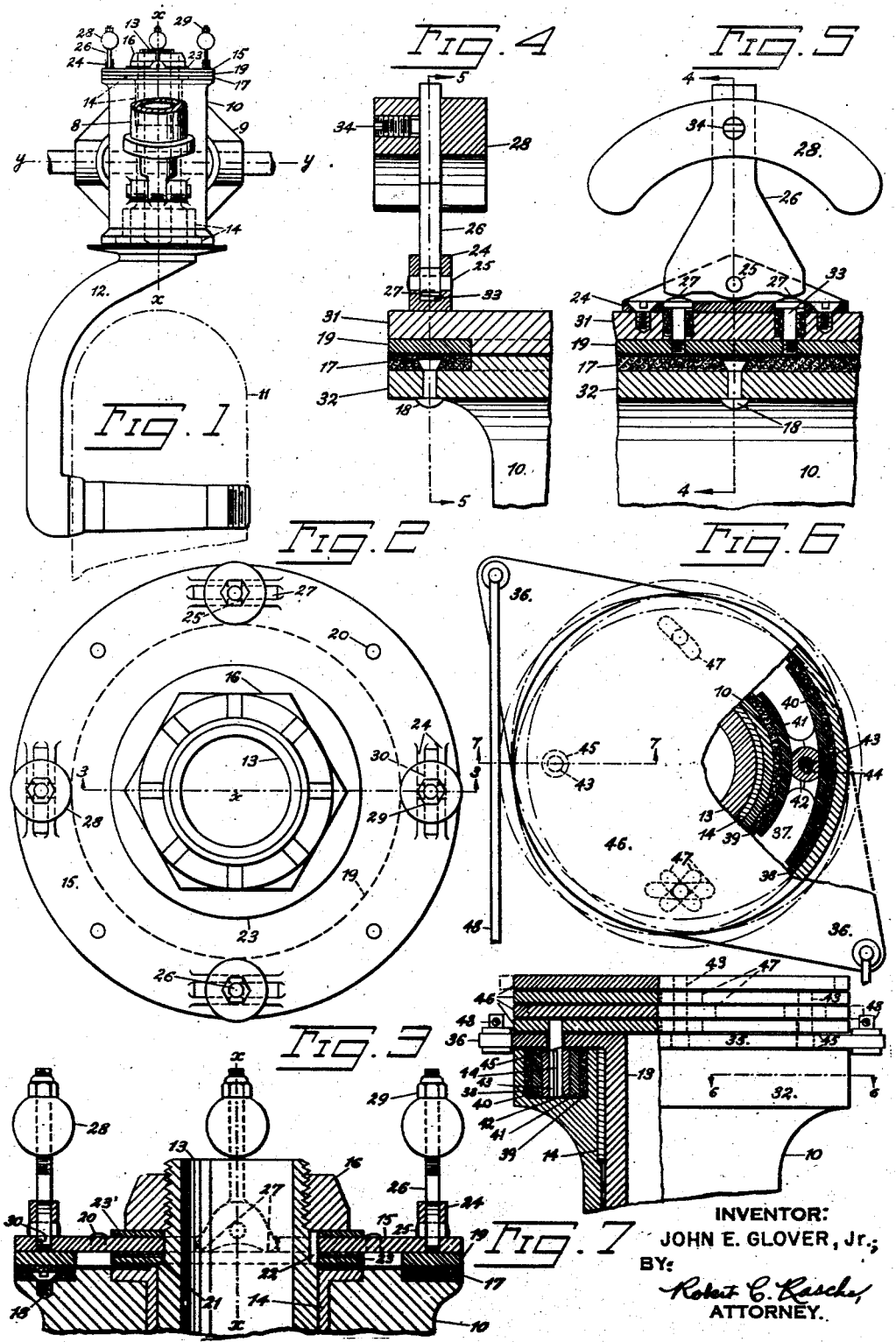
INVENTOR:
JOHN E. GLOVER, Jr.;
BY:
Robert C. Rasche
ATTORNEY.

Patented May 7, 1946

2,399,732

UNITED STATES PATENT OFFICE 2,399,732

AIRCRAFT STRUCTURE

John E. Glover, Jr., Queens Village, N. Y., assignor to Republic Aviation Corporation, a corporation of Delaware Application July 24, 1943, Serial No. 496,072

11 Claims. (Cl. 244—109)

This invention relates to wheeled landing gear for aircraft, and more especially to such as have a free castering, and/or swivelling, action, such as tail-wheels and nose wheels, which have a tendency to oscillate or shimmy when running in contact with the ground. While the amplitude of these shimmy-vibrations or other obnoxious oscillations is usually small at their inception, they tend to compound themselves eventually to proportions quite dangerous to the integrity of the landing-gear structure and to the control of the airplane moving on the ground; and do so very quickly, if not effectively and completely damped right at their inception.

Devices have heretofore been provided or proposed for damping these oscillations, but only after these oscillations have gotten up momentum; and they have all been either of the hydraulic dash-pot type, that is, of the fluid pressure type; or of the continuous sliding-friction type. The former are too bulky and cumbersome for the ordinary airplane, and in addition require considerable attention in the way of lubrication, leak-prevention, and adjustment of working parts. Those of the latter type have hitherto been objectionable because they usually are of such a construction as to unintentionally hamper the normal swivelling motions of the tail wheel or nose wheel; or to interfere with the free castering of the wheel, as when trundling the airplane into or out of, the hangar; or to hinder the operation of the self-centering and locking mechanisms; or, if the wheel is of the steerable type, to impair the manual operation of the steering mechanism of the ground-wheel.

It has also been proposed, in order to check these shimmy oscillations, to employ the inertia of a fly-wheel arrangement, or the like, but such devices, especially for relatively small airplanes in which the weight of each component has to be kept to an irreducible minimum, have to be of such proportions, in order to effectively equilibrate the mass of the wheel, yoke and spindle, as to be too heavy and bulky to be at all usable.

The definitive object of the invention is to provide an aircraft landing gear with improved means for preventing shimmy-vibrations and which will have none of the disadvantages of, and will be more effective than, said prior devices.

A particular object of the invention is to provide an aircraft landing gear with shimmy-damping means of a kind which will be activated at the inception of said obnoxious oscillations, or other sudden shocks to the running gear; and will effectively check them right at the outset, that is, before they have time to build up sufficiently to become dangerous to the landing-gear structure and to the control of the airplane.

Another particular object of the present invention is to provide a landing gear with a shimmy-damping device of the sliding-friction type, and in which the frictional resistance opposing the oscillation of the landing gear will be applied only at the very instant when the shimmy and other sudden lateral shocks actually occur, so that at all other times it will readily permit the free castering and swivelling of the wheel, as during taxying or during trundling into and out of the hangar; also at all other times permitting the free operation of the landing wheel self-centering device and the landing wheel locking mechanism, as well as the free operation of the landing-wheel steering mechanism, when the last is present.

Still another object is to provide a damping device having the present improved nature which will nonetheless be of relatively small size, and be light and compact; and which can be easily and readily applied to completed landing gear without necessitating any substantial change in the structure of the completed landing gear, as well as initially built-in while building the original landing gear.

Other features and advantages of the invention, including various novel combinations of parts and particular constructions, will become apparent from the following description of the several illustrative embodiments shown in the accompanying drawing, in which:

Figure 1 is a partial front elevation of the shimmy-damping device, according to one form of the invention, applied to a tail-wheel swivel post;

Figure 2 is a plan view, on a larger scale, of the device shown in Figure 1;

Figure 3 is a partial axial-section on line 3—3 of Figure 2, showing in greater detail, the means for damping out oscillations of the wheel;

Figure 4 is a partial radial section, on the line 4—4 of Figure 5, of another embodiment of the invention;

Figure 5 is a partial tangential section of the line 5—5 of Figure 4 of said other embodiment;

Figure 6 is a plan view of a steerable tail wheel post provided with still another embodiment of the invention, said figure being partly broken away in horizontal section on the line 6—6 of Figure 7 to show the damping means; and Figure 7 is a partial front elevation, with parts in section, on the line 7—7 of Figure 6 of said embodiment.

The first form in which the inventive concepts are embodied, is shown adapted, in Figures 1, 2 and 3, to the swivel post 10 of an aircraft tail wheel 11, mounted on a yoke 12 and a spindle 13 pivotally mounted along the swivelling axis x—x of said post in plain bearings 14. The tail-wheel group also includes a conventional shock-absorber strut 8 and a conventional yoke 9, having a pivot-axis y—y.

In this embodiment, the damping, or "anti-shimmy," device includes a swivelling plate 15, secured to the top of the spindle 13 by means of a nut 16, and a disc brake comprising a fixed friction ring 17, mounted in a circular rabbet provided in the top of the post 10 and fastened to the latter by means of countersunk screws 18; and a movable pressure ring 19, resting freely upon the ring 17 but constrained to follow the angular movements of the plate 15 by means of four dowels 20.

In order to prevent the plate 15 from pressing down, undesirably, upon the ring 19 when the nut 16 is tightened, the spindle 13 is formed, at a level slightly above the top surface of the post 10, with a shoulder 21; and a laminated shim 23, layers of which can be peeled off to reduce it to the desired thickness, is interposed between the plate 15 and said shoulder, while a solid washer 23' is interposed between the plate 15 and the nut 16. A key 22 is also provided, for obvious reasons.

The plate 15 is provided near its periphery with a circular series of four equidistant split bosses, or projections, 24 each forming a pair of bearings for a radial pivot 25 on which is freely mounted a vertical brake lever 26 bifurcated at its lower end so as to form a pair of horns 27 and carrying, screwed on its threaded free end, an inertia member, or weight, 28. The distance between the center of gravity of each of these weights and the corresponding pivot 25 may be varied by means of a nut 29 so as to allow for tuning of the phase of the oscillations of the levers 26. Each pair of horns 27 works in a tangential slot 30 provided under each boss 24 across the plate 15, and normally each pair merely lightly touches the upper surface of the pressure ring 19 without applying any appreciable pressure thereto.

In operation, this first embodiment of the damping device functions as follows: As the normal swivelling motions of the spindle 13 in the post 10 are gradual, i. e. have a relatively slow angular acceleration, inertia has a relatively small effect upon the weights 28 during these normal motions, which occur when the wheel 11 is running along the ground, when the craft is moved around by hand on the ground, or during the operation of the self-centering mechanism of the wheel. The small amount of energy thereby developed is mostly absorbed by the friction between the levers 26 and the bearings 24. Therefore, there is practically no relative movement of these levers 26 with respect to the rotating plate 15, and consequently no appreciable action of the brake 17, 19 occurs during said normal motions. On the other hand, any sudden, sharp, or violent lateral shock to the running wheel 11 in either direction, or any energy tending to set up a shimmy action therein, will subject the swivelling spindle 13 to a torque force, the momentum of which torque will create a sharp shock of inertia in the masses 28. These masses will then "sit back of," or lag behind, the corresponding pivots 25, due to this shock of inertia, and the rear horns 27 of the brake levers 26 are then violently depressed upon the pressure plate 19. The torque will thus be effectively resisted by this sudden application of the brake 17, 19 at the very inception of the first obnoxious oscillation. The greater the torque, the greater will be the braking action, and since there is practically no play or lost motion between the spindle 13 and the plate 15, on one hand, and between the inertia masses 28 and the brake 17, 19, on the other hand, this first oscillation will already have been effectively damped before it reaches the end of its first quarter cycle of oscillation. During the ensuing, and thereby hastened, deceleration of the angular speed of the plate 15, near the end of this first quarter oscillations, the masses 28 swing ahead, on the opposite side of the pivots 25, due to their own momentum and to the elastic relaxation of the brake 17, 19, and the front horns 27 of the brake levers 26 then apply a second violent and short braking action at the end of this first quarter oscillation. This second braking action sustains itself during the acceleration taking place at the beginning of the second quarter of said first oscillation in the opposite direction and this process repeats itself at each reversal of the direction of motion of the plate 15 until the amplitude of these obnoxious oscillations is progressively reduced to the vanishing point.

In the embodiment shown in Figures 4 and 5, the disc brake 17, 19 is mounted in two adjacent peripheric rabbets cut in superposed flanges 31, 32 formed at the top of the spindle and of the post 10, respectively. As in the first embodiment, the brake-lining ring 17 is fastened to the post 10 by means of countersunk rivets 18, but the pressure ring 19 in this modification is resiliently suspended under the flange 31 of the spindle by means of four pairs of spring-actuated suspension screws 33. The heads of these screws 33 project slightly above the surface of the flange 31 and act as coupling means (similarly to the dowels 20 in the first embodiment) between this flange 31 and the pressure ring 19. Any of the horns 27 of the brake levers 26 cooperates with the corresponding screws 33 to press the pressure ring 19 down on the brake lining ring 17 against the action of the springs of said screws each time a shock suddenly moves the flange 31 in one direction and thereby causes the masses 28 to swing by inertia in the opposite direction about the pivots 25. Adjustment of the amplitude of the oscillations of the levers 26 and tuning of the phase of said oscillations in this embodiment is effected by means of set-screws 34.

If desired, a modification of the shape of the levers 26 may be made according to which said levers are recurved and project downwardly around the periphery of the flanges 31, 32, thereby to reducing the overall height of the damping device.

Figures 6 and 7 show a third embodiment of the damping device according to the invention, adapted to a steerable tail wheel (not shown). In this embodiment, a steering plate 35 having two diametrically opposed steering horns 36 is formed integrally with the top of the spindle 13. In the flange 32 of the post 10 is provided a circular groove 37, the side walls of which are lined with coaxial brake linings 38, 39. Two circular series of four brake shoes 40, 41, mating these brake linings, are freely mounted between said brake linings in the groove 27. Each pair of coaxial brake-shoes 40, 41 is radially and simultaneously moved in opposite directions against the brake-linings 38, 39, respectively, when the tail wheel oscillates suddenly or violently, by means of a double-acting cam 42, fastened at the lower end of a vertical pin 43 by means of a key 44. These four pins 43 are pivotally mounted as at 45 on the steering plate 35 and are scaled in height in order to be able to carry, on their respective upper ends, four superposed inertia discs 46. Suitable arcuate slots 47 are provided in the intervening discs 46 on either side of the pins 43 to allow for free swinging of each of these discs about its own eccentric pivot 43 when an angular inertia-setback occurs. 48 indicates the usual cables connecting the steering plate 35 to the rudder control (not shown).

While several illustrative embodiments have been described in detail, it is to be understood that the inventive concepts are limited in the embodiments they can take, only by the scope of the sub-joined claims. It is also to be understood that the inventive concepts can be as equally well applied to nose-wheels, as in tricycle landing gear, as to the tail-wheels, of landing gear.

Having thus disclosed the inventive concepts and several embodiments thereof, what is claimed as new is:

1. In an aircraft tail wheel assembly having a post and a wheel-carrying spindle swivelled to said post, an anti-shimmy device comprising, in combination: a peripheric rabbet formed at the top of said post; a swivelling plate mounted on the top of said spindle; a brake-lined reaction member fastened within said rabbet; a mating pressure-ring coupled to said plate and normally applying to said reaction ring only the pressure due to its own weight; a circular series of brake levers pivotally mounted on said swivelling plate and each provided with a pair of horns engageable with said pressure ring; and inertia masses adjustably mounted on the free ends of said levers.

2. In an aircraft tail wheel assembly having a post and a wheel-carrying spindle swivelled to said post, an anti-shimmy device comprising, in combination: superposed flanges formed at the top of the post and of the spindle, respectively; adjacent peripheric rabbets provided within said flanges; cooperating brake rings lodged in said rabbets, the lower one being fastened to the post flange, the upper one being resiliently suspended from the spindle flange; pairs of spring-actuated dowels forming said resilient suspension and coupling said upper brake-ring to the spindle-flange; a circular series of brake levers pivotally mounted on the spindle flange and each provided with a pair of horns engageable with a corresponding pair of said dowels; and inertia-masses mounted on the free ends of said levers.

3. In an aircraft steerable landing-wheel assembly having a flanged post, a tail-wheel-carrying spindle swivelled to said post and a steering plate carried on top of said spindle, an anti-shimmy device, comprising, in combination: a circular groove formed in the flange of said post; brake-linings fastened to the side walls of said groove; mating shoe-brakes circularly arranged between said brake-linings; a circular series of brake cam-levers swivelled to said steering plate and each provided with two pairs of diametrically opposed horns engageable with said brake-shoes; and superposed inertia discs eccentrically mounted on the free ends of said cam-levers.

4. The combination with an aircraft landing gear post, of a wheel spindle angularly but not axially movable therein, complemental friction elements carried by the post and spindle respectively and positioned out of operative braking association during normal ground operations, and inertia means carried by said spindle and responsive to the oscillations thereof to brakingly associate said complemental friction elements to thereby damp the oscillations of the spindle aforesaid.

5. The combination with an aircraft landing gear post, of a wheel spindle angularly but not axially movable therein, a friction element fixed to said post, a companion friction element angularly movable with said spindle and axially movable into and out of operative braking engagement with the friction element on the post aforesaid, an inertia responsive control carried by and movable with the spindle during normal ground operations, and movable relatively to said spindle in response to the oscillations thereof, and means whereby the movements of the control relatively to the spindle effects operative braking engagement between said friction elements to damp said oscillations.

6. The combination with an aircraft landing gear post, of a wheel spindle angularly but not axially movable in said post, a stationary friction member on said post, a companion friction member movable into and out of braking engagement with the stationary friction member, an inertia responsive control carried by said spindle and movable in response to the oscillations thereof, and a connection between said control and said companion friction member whereby the movement of the former in response to the oscillations of the spindle effects a braking engagement between said friction members to counteract the oscillations of said spindle.

7. The combination with an aircraft landing gear post, of a wheel spindle angularly but not axially movable therein, a stationary brake member fixed to said post, a parallel coextensive companion brake member and movable with said spindle and into and out of braking association with the stationary member, a control member pivotally carried by said spindle and responsive to the oscillations of said spindle, and an operative connection between said control member and said companion brake member whereby the response of said control member to the oscillations of the spindle brings said brake members into braking association.

8. The combination with an aircraft landing gear post, of a wheel spindle angularly but not axially movable therein, a stationary friction brake member carried by said post, a parallel, coextensive companion brake member coupled to said spindle and movable into and out of braking association with the stationary brake member, control members pivotally carried by the spindle to swing in response to the oscillations thereof, and means operated by the pivotal movement of said control members to bring said brake members into braking association.

9. The combination with an aircraft landing gear post, of a wheel spindle swiveled therein, an outstanding stationary brake member fixed to said post, an outstanding plate fixed to said spindle for movement therewith in a plane parallel to the plane of the stationary brake member, a ring interposed between said plate and said stationary brake member to be moved into and out of braking association with the latter, and means pivoted to said plate movably to respond to the oscillations of the spindle and operable to effect a braking association between said ring and said stationary brake member.

10. The combination with an aircraft landing gear post, of a wheel spindle swiveled therein, an outstanding stationary brake member fixed to said post, an outstanding plate fixed to said spindle for movement therewith in a plane parallel to the plane of the stationary brake member and having a series of openings therethrough, a ring interposed between said plate and said brake member to be moved into and out of braking association with the latter, brake levers pivoted to said plate having weighted outer extremities, and means at the inner extremities of said levers operable through said openings to effect braking association between the ring aforesaid and the stationary braking member.

11. The combination with an aircraft landing gear post, of a wheel spindle having but one freedom of motion therein, complemental friction elements associated with the post and spindle respectively so as to form a brake inoperative during normal ground operations, and inertia means carried by said spindle and responsive to oscillations thereof to operate said brake and thereby damp said oscillations.

JOHN E. GLOVER, Jr.